United States Patent [19]

Gram

[11] Patent Number: 4,505,121

[45] Date of Patent: Mar. 19, 1985

[54] METHOD OF FREEZING ARTICLES IN CONTAINERS AND APPARATUS FOR CARRYING OUT THE METHOD

[75] Inventor: Klaus Gram, Vojens, Denmark

[73] Assignee: Brødrene Gram A/S, Vojens, Denmark

[21] Appl. No.: 578,440

[22] Filed: Feb. 9, 1984

[30] Foreign Application Priority Data

Feb. 11, 1983 [DK] Denmark ................ 604/83

[51] Int. Cl.³ .................................... B65B 63/08
[52] U.S. Cl. ............................ 62/60; 62/73; 62/351; 62/371; 165/2
[58] Field of Search ............. 62/1, 60, 371, 7, 71, 62/73, 66, 349, 351; 165/2

[56] References Cited

U.S. PATENT DOCUMENTS

| 1,888,178 | 11/1932 | MacElhole | 62/60 |
| 1,968,183 | 7/1934 | Vogt | 62/60 |
| 2,063,069 | 9/1937 | Bedford | 62/1 |
| 2,123,215 | 7/1938 | Thomas | 62/60 |
| 2,800,456 | 7/1957 | Shepherd | 62/1 |
| 3,607,303 | 9/1971 | Bingham | 62/60 |
| 3,864,935 | 2/1975 | Elson | 62/60 |

FOREIGN PATENT DOCUMENTS 2122662 1/1972 France .

*Primary Examiner*—Ronald C. Capossela
*Attorney, Agent, or Firm*—Watson, Cole, Grindle & Watson

[57] ABSTRACT

In order to freeze articles in containers, the side of the containers against which the material to be frozen would normally contact is provided with a frozen coating consisting of a lining material having a lower melting temperature than the material to be frozen. The article, after being frozen in the container, may be easily removed from the container by heating the container to a temperature between the melting point of the lining material forming the coating and the material of the article such that the article will be loosened with respect to the container without any melting (or distortion) thereof. An apparatus for carrying out the method comprises a first cooling coil for cooling the containers, a nozzle for providing the internal surfaces of the containers with a frozen coating consisting of a material which is easier to melt than the material to be frozen, a filling tube for introducing the material to be frozen into the cooled containers, and a second cooling coil for freezing the content of the containers.

7 Claims, 4 Drawing Figures

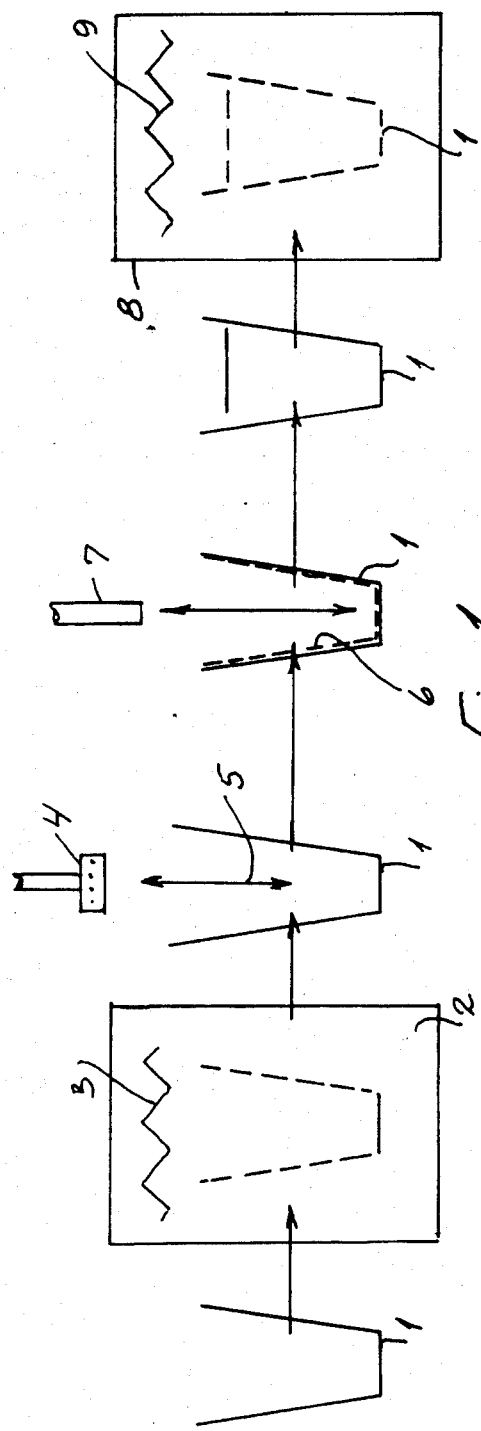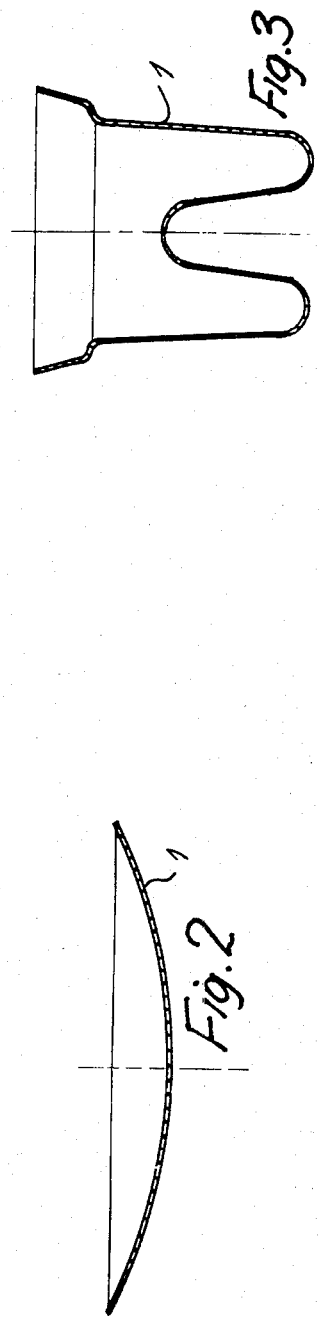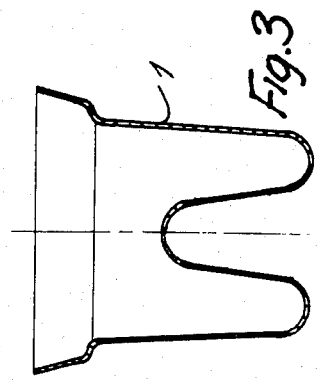

METHOD OF FREEZING ARTICLES IN CONTAINERS AND APPARATUS FOR CARRYING OUT THE METHOD

BACKGROUND OF THE INVENTION

The present invention relates to a method of freezing articles in containers.

When freezing articles in containers it is known to use containers in the form of either freezing moulds (from which the articles are removed prior to sale) or packings (which are sold with the article still therein). The freezing moulds are filled with the material to be frozen and are subjected to a cooling, which may be carried out either in a cold space or by treating the freezing moulds outwardly with a cold medium. In cases where the articles are to be frozen in packings, freezing in cold air is usually conducted after the packing has been filled with the material to be frozen.

When the frozen articles are to be removed from the corresponding containers, a superficial thawing operation is carried out. Industrially, this operation may be carried out by briefly subjecting the containers containing the frozen articles to a thawing medium having a temperature which is higher than the melting point of the frozen material concerned, in such that the articles are loosened with respect to the containers or moulds by a thawing of their outer surface, whereinafter the articles may be removed. In cases where the articles in question are frozen in the packings, in which they are to be sold, or in parts thereof, the buyer subjects the packing of the article to a heating effect, e.g., by removing the packed article from the refrigerator, whereinafter the article may be removed from the packing.

During such loosening of the articles in question with respect to the containers in which they have been frozen by thawing, a melting of the outer layer of the articles is caused.

However as a result the articles removed from the containers will not have the exact shape wanted. If, for instance, the thawing operation is carried too far, the material of the article in question may flow, such that the shape of the article is distorted. This is of particular importance when complicated shapes are involved, but it is not without importance even when simple shapes are concerned, i.e., seeing that a flowing of superficial material as referred to above distorts the shape aimed at. The problem is particularly pronounced in cases where the frozen material should be attractive when it is to be served, and the problem referred to is particularly pronounced when the articles are made of ice cream, because such ice cream does not have a well defined melting point and, accordingly, it is necessary to carry out a comparatively effective thawing in order to be sure that the article in question can be removed from the corresponding container.

SUMMARY OF THE INVENTION

According to the present invention the side of the containers against which the material to be frozen would normally contact is provided with a frozen coating consisting of a liner material having a lower melting temperature than the material to be frozen. Thus, the problem referred to above is obviated because when the frozen article is to be removed from the container, in which the freezing has been carried out, it is only necessary to provide for a heating of the container such that only a sufficiently great part of the coating material is melted, whereas the article in the container is not thawed. Thereafter, the article can be removed from the container without its intended shape being altered.

A simple way of providing the frozen coating consists, according to the invention, in cooling the containers before providing the coating therein to a temperature lower than the freezing point of the coating material. Accordingly, in this instance the principle is used that when the container in question is subcooled before applying of the coating material, the material of the container will be capable of freezing the coating material.

All previously known containers wherein articles are frozen may be used, i.e., both true industrial freezing moulds, e.g., moulds for producing ice lollies, moulds for producing dessert ice cream, moulds for freezing foodstuffs, and packings for frozen articles e.g., dessert ice cream and foodstuffs. However, according to the invention appropriately divided moulds are used as the containers. When divided freezing moulds are concerned, the problem referred to above as regards the distorted shape of the articles is particularly pronounced because divided freezing moulds usually are used for producing frozen articles having complicated outer shapes, which may easily be distorted by too extensive a thawing operation. In this connection reference should, e.g., be made to the so-called figure ice lollies. However, even when using such divided freezing moulds in the method according to the present invention, the details as regards the outer shape of the articles concerned, are retained.

As noted above, it is also appropriate according to the invention to use as the containers packings, which will constitute the final packings of the articles. By means of this embodiment the buyer of such a packing containing a frozen article may remove the packing with a minimum risk that parts of the article therein may remain in the packing and with a, minimum risk that the shape of the article concerned may be distorted. Accordingly, the buyer will be assured that the article in question will be attractive when served.

In case ice cream is used as the material to be frozen, water may be used as the coating material. Thereby the problem referred to above as regards the not well defined melting point of ice cream is solved in a very economic way. Water is a cheap coating material and has exactly a melting point which lies appropriately far below the melting point of the ice cream, which is not very well defined, in such a way that the thawing-loose operation can be carried out without any considerable melting of the ice cream itself, viz. in such a way that the ice cream in question may maintain its shape undistorted.

Moreover, it should be noticed that in cases where the material to be frozen is ice cream, it is possible by using the method according to the present invention to avoid the problem which otherwise may result from dripping from the mainly frozen articles after the removal, which dripping otherwise, due to the fact that it previously consisted of ice cream, could result in unsanitary conditions. If water is used as the coating material or separating material as explained above, a dripping, if any, preferably will happen in the form of water and, accordingly, in a far more sanitary way. The use of the method according to the present invention in connection with divided moulds and by the freezing of ice cream, furthermore, solves the problem which previously has been connected with this kind of production which, until now, has proved to be very difficult to perform, due to the fact that it is difficult to thaw up ice cream in a well defined way. Accordingly, by producing, e.g., figure ice lollies in divided moulds, it has previously been necessary to produce such ice lollies from the so-called water ice which has a far more well defined melting point than ice cream.

According to the present invention it is appropriate to spray the coating material upon the corresponding container in a liquid state. In this way it is possible to achieve a very even coating layer having a well defined thickness, viz. just sufficient for assuring that only the coating layer in question is melted by the thawing-loose operation. Due to the fact that the container concerned has been cooled to a temperature which lies below the freezing point of the coating material in question, the coating material will freeze almost instantly when it is sprayed upon the container.

The invention also relates to an apparatus to be used by carrying out the method, which apparatus according to the invention including means for cooling the containers in which the freezing is to be carried out, means for applying a frozen coating consisting of a material having a lower melting temperature than the material to be frozen against the side of the containers intended to be brought into contact with the material to be frozen, means for introducing, in a way known per se, the material to be frozen into the cooled containers and means for freezing, in a way known per se, the contents of the containers in question.

BRIEF DESCRIPTION OF THE DRAWING

FIG. 1 shows schematically an embodiment of the apparatus to be used by carrying out the method according to the invention, FIGS. 2 and 3 different embodiments of containers to be used by carrying out the method, and FIG. 4 a container in the form of a divided freezing mould to be used by carrying out the method.

DESCRIPTION OF THE PREFERRED EMBODIMENT

Figure 4:
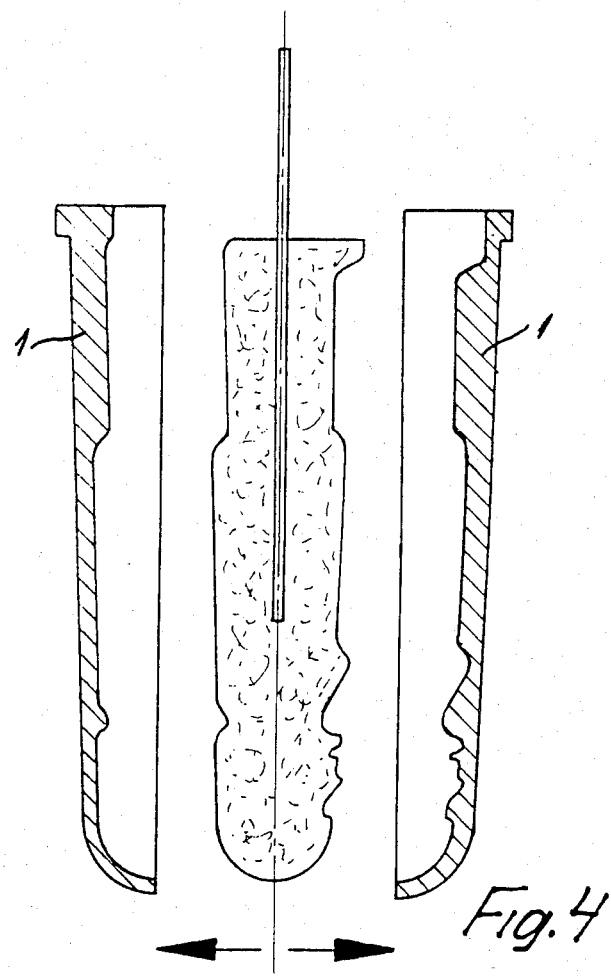

In the drawing, 1 is the container which is intended to accomodate material to be frozen. In principle, the container 1 may be shaped in any way and may be produced from any material, but should, however, have an appropriate specific heat. As a first step of the method, the container 1 is arranged in a space 2 cooled by means of a cooling coil 3. Instead of such space a cooling tunnel may be used, or the container in question may be cooled in some other way. When the container has achieved an appropriately low temperature, it is removed, and the inner surface of the container is now sprayed by means of a nozzle device 4 with a material having an appropriately low melting point, e.g., water. The nozzle 4 is movable up and down as indicated by means of the arrow 5 in such a way that, generally, the whole inner surface of the container 1 will be sprayed. Due to the fact that the container has been previously subcooled to a temperature lying below the freezing point of the liquid in question, the cold container will immediately remove the melting heat from the material in question in such a way that a coating of the sprayed material will be frozen upon the inner surface of the container 1. This coating is in FIG. 1 marked by means of broken lines 6. Accordingly, it will be understood that the container concerned must have such specific heat and must be subcooled to such temperature that the container is capable of removing so much melting heat from the material sprayed that a coating 6 having the requested thickness is achieved. Then material to be frozen is introduced into the container 1 in a way known per se. Such filling may be easily achieved by means of a filling tube 7 which is connected with a filling apparatus, and which operates in the way that the filling tube, before the filling is initiated, is moved approximately down to the bottom of the container 1, whereinafter the filling is started during withdrawal of the filling tube, until the amount requested has been introduced into the container 1. After introducing the material to be frozen, the container 1 is positioned in a space 8 which is cooled, e.g., by means of a cooling coil 9 and the material introduced is frozen in the space 8. Both the space 8 and the space 2 are to be regarded as symbolic, seeing that it will be understood that any kind of freezing space may be used as the space 8.

If packings in which the frozen articles are to be sold are used as the containers 1, the space 8 may, e.g., consist of a cooled storing space which is maintained at a temperature which is lower than the melting temperature of the material in question. It should be noticed that no considerable risk exists that the coating 6 should disappear during or after the filling of the material to be frozen. The material to be frozen will be filled while it its temperature is higher than the melting point of the coating layer because the melting point of the coating, as mentioned, is lower than the freezing temperature of the material concerned. However, even if the material in question is not filled while it has such low temperature as referred to above, a risk that the coating layer 6 will disappear will nevertheless be minimal, provided the filling of the material to be frozen is carried out as explained above. As soon as a filling of the bottom of the container 1 has taken place, the coating material positioned on the bottom and along the lower parts of the sides of the container 1 will not be able to escape, i.e., even if some melting should occur, due to the fact that a melting of the coating 6, if any, will occur concurrently with the filling of the material in question. Furthermore, the container 1 may be cooled previously to such a degree that a superficial freezing of the material in question takes place immediately after the filling of the material.

If packings to be sold are used as the containers 1, the method may be regarded as finished as soon as the material in question has been sufficiently frozen, e.g. in a freezing storage space, and under such circumstances it is appropriate to use the space 8 as such freezing storage space. The buyer of the product in question may now easily remove the packing in question from the frozen article after the product has been positioned in an appropriately heated space or after a heat treatment, whereby the coating layer 6 melts and the packing may be removed without any appropriate melting of the surface of the frozen article.

If, as the containers 1, moulds for a freezing plant are used, it will usually be impractical to store such moulds in a cooled storing space, and accordingly the articles concerned are appropriately removed from the containers in question when the articles have obtained a rigidity sufficient to be handled, whereinafter the articles are positioned in a freezing store and the moulds are returned for reuse in the apparatus concerned. As an example of such apparatus reference should, e.g., be made to an ice lolly freezing machine wherein the freezing pockets for freezing the frozen bodies represent the containers 1 and where the machine concerned is provided with a section or a station for subcooling the moulds, viz. corresponding to the space 2, a station for spraying the inner surface of the freezing pockets, a station for filling the freezing pockets, a station for at least partly melting the coating 1 and removing the frozen bodies concerned when the latter have achieved a rigidity sufficient to be handled, whereinafter the articles concerned may be positioned in a freezing store for final freezing. In FIG. 2 another container is illustrated, viz. in the form of a bowl which may be used as explained above as regards the container 1, and in FIG. 3 a rather complicated container is shown in the form of a freezing mould or freezing pocket which may be used in the same way as explained above. In FIG. 4 a more complicated mould, viz. a divided mould, is used for producing a figure, and which also may be used as explained above in connection with FIG. 1.

Even though water has been mentioned above as the coating material in question, it will be understood that other materials may also be used, provided they have a melting point which is below the melting point or the melting point range for the material to be frozen. In particular, in connection with FIG. 4 it should be noticed that it previously has been difficult to produce figures of the shape shown therein from ice cream because the surface of the figure was so easily distorted when subjected to a thawing for removal from the mould. However, this problem is solved if the inner surfaces of the mould are provided with a coating as explained above, because thereby a thawing loose of the figure in question can be carried out without melting the material of which the figure consists.

I claim:

1. A method of making frozen articles in freezing molds comprising cooling said freezing molds while empty to a temperature below the freezing temperature of a liner fluid, spraying the inner surfaces of said cooled freezing molds with said liner fluid so as to freeze a coating upon said inner surfaces by extracting heat from said liner fluid by said cooled freezing molds, filling said freezing molds with the material to form said frozen articles, cooling said freezing molds to freeze said material and form said frozen articles, heating said freezing molds with the coatings and frozen articles therein sufficiently to melt said coatings, and removing said frozen articles from said freezing molds.

2. The method as defined in claim 1, wherein said liner fluid is water.

3. The method as defined in claim 1, wherein said material is ice cream.

4. A method of making a frozen article having an intended shape comprising the steps of providing a container having an interior surface corresponding to said intended shape; cooling said container to a first temperature; spraying a liner fluid which has a melting temperature which is higher than said first temperature onto the interior surface of said container, said liner fluid thereby forming a solid coating on the interior surface of said container due to the heat extracted therefrom by said container; filling said container containing said solid coating therein with the material for making said frozen article, said material having a melting temperature which is higher than that of said liner fluid; further cooling said container so as to freeze said material into said desired shape; heating said container sufficiently to at least partially melt said liner fluid forming said coating yet not melt the surface of said frozen article therein; and removing said frozen article having the intended shape from said container.

5. The method as defined in claim 4, wherein said liner fluid is water.

6. The method as defined in claim 4, wherein said material is ice cream.

7. An apparatus for making a frozen article having an intended shaped shape, said apparatus including means forming a freezing space in which containers having interior surfaces which correspond to said intended shape can be positioned, cooling means associated with said freezing space for cooling same, a spray nozzle means movably mounted within said means forming said cooling space for spraying a liner fluid onto the interior surfaces of said containers therein, a filling tube means mounted within said means forming said cooling space for introducing the material to be made into said frozen articles into said containers, and heating means associated with said freezing space for heating same.

* * * * *